United States Patent
Patankar et al.

(10) Patent No.: US 12,132,310 B2
(45) Date of Patent: Oct. 29, 2024

(54) ACTIVE POWER CONTROL IN RENEWABLE POWER PLANTS FOR GRID STABILISATION

(71) Applicant: VESTAS WIND SYSTEMS A/S, Aarhus N. (DK)

(72) Inventors: Manas Patankar, Glen Huntly (AU); Hugh McKenzie, Melbourne (AU); Mu Wei, Solbjerg (DK); Jacob Quan Kidmose, Risskov (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 328 days.

(21) Appl. No.: 17/779,410

(22) PCT Filed: Nov. 25, 2020

(86) PCT No.: PCT/DK2020/050332
§ 371 (c)(1),
(2) Date: May 24, 2022

(87) PCT Pub. No.: WO2021/104596
PCT Pub. Date: Jun. 3, 2021

(65) Prior Publication Data
US 2023/0006443 A1    Jan. 5, 2023

(30) Foreign Application Priority Data
Nov. 25, 2019   (DK) .......................... PA 2019 70722

(51) Int. Cl.
*H02J 3/00*   (2006.01)
*H02J 3/32*   (2006.01)
*H02J 3/38*   (2006.01)

(52) U.S. Cl.
CPC ............... *H02J 3/004* (2020.01); *H02J 3/32* (2013.01); *H02J 3/381* (2013.01); *H02J 2203/10* (2020.01); *H02J 2300/28* (2020.01)

(58) Field of Classification Search
CPC .... H02J 2203/10; H02J 2300/28; H02J 3/004; H02J 3/241; H02J 3/32; H02J 3/381; H02J 3/48
See application file for complete search history.

(56) References Cited

U.S. PATENT DOCUMENTS

2008/0195255 A1* 8/2008 Lutze .................... F03D 7/0284
                                                                        705/400
2011/0276269 A1* 11/2011 Hummel ................. G01W 1/10
                                                                        702/3
(Continued)

FOREIGN PATENT DOCUMENTS

CN       108964083 A      12/2018
DE    102016124840 A1      6/2018
(Continued)

OTHER PUBLICATIONS

Danish Patent and Trademark Office, 1st Technical Examination including The Search Report and Search Opinion for Application PA 2019 70722 dated May 7, 2020.
(Continued)

*Primary Examiner* — Vincent H Tran
(74) *Attorney, Agent, or Firm* — Patterson + Sheridan, LLP

(57) ABSTRACT

Aspects of the present invention relate to a method for controlling a renewable power plant connected to a power network to reduce deviation of a measured frequency of the power network from a target frequency. The method comprises determining a forecasted power gradient over a forecast interval defined between a first time point and a second time point, and, at a third time point during the forecast
(Continued)

interval, controlling the power plant to output active power according to a minimum active power level if the measured frequency at the third time point is below the target frequency, controlling the power plant to output active power according to a maximum active power level if the measured frequency at the third time point is above the target frequency. The maximum and minimum active power levels are based on the forecasted power gradient.

19 Claims, 4 Drawing Sheets

(56) References Cited

U.S. PATENT DOCUMENTS

| | | | |
|---|---|---|---|
| 2014/0316592 A1* | 10/2014 | Haj-Maharsi | G05B 15/02 |
| | | | 290/44 |
| 2015/0159626 A1 | 6/2015 | Tarnowski | |
| 2015/0159627 A1* | 6/2015 | Nielsen | F03D 80/60 |
| | | | 290/44 |
| 2015/0184632 A1* | 7/2015 | Sagi | F03D 7/048 |
| | | | 290/44 |
| 2016/0061188 A1* | 3/2016 | Sagi | F03D 7/048 |
| | | | 290/44 |
| 2016/0333852 A1 | 11/2016 | Busker | |
| 2017/0337495 A1* | 11/2017 | Ghosh | H02J 3/46 |
| 2018/0039244 A1* | 2/2018 | Son | G06Q 10/04 |
| 2018/0191160 A1* | 7/2018 | Carr | H02J 7/0068 |
| 2019/0020198 A1 | 1/2019 | Beekmann | |
| 2019/0157876 A1* | 5/2019 | Dobrowolski | H02J 3/466 |
| 2020/0259358 A1* | 8/2020 | Hansen | H01M 10/425 |
| 2020/0381921 A1 | 12/2020 | Brombach | |
| 2021/0167601 A1* | 6/2021 | Gupta | H02J 3/48 |

FOREIGN PATENT DOCUMENTS

| | | |
|---|---|---|
| KR | 20190092533 A | 8/2019 |
| WO | 2012171532 A2 | 12/2012 |
| WO | 2021104596 A1 | 6/2021 |

OTHER PUBLICATIONS

PCT, Notification of Transmittal of The International Search Report and The Written Opinion of The International Searching Authority, or The Declaration for Application PCT/DK2020/050332 dated Feb. 18, 2021.

* cited by examiner

ACTIVE POWER CONTROL IN RENEWABLE POWER PLANTS FOR GRID STABILISATION

TECHNICAL FIELD

The present invention relates to a method of controlling a renewable energy power plant, a renewable energy power plant controller, and to a wind turbine power plant and to renewable energy power plants more generally.

BACKGROUND

Newly commissioned renewable power plants, and more particularly wind power plants, are expected to be able to operate and adapt to a number of different circumstances when connected to a power network. A wind power plant typically comprises a plurality of wind turbine generators and is also known as a wind park or a wind farm. The regulation and general operation of the power plant is controlled by a power plant control system or controller (PPC), which implements operational limits and requirements as set out by a power grid operator such as a Transmission System Operator (TSO) or a Distribution System Operator (DSO), or by country- or region-specific grid interconnection requirements, known as 'grid codes'.

Some power grid operators implement operational requirements for wind power plants that relate to the stability of the power network. The stability of a power network is often measured in relation to frequency. Typically, power grid operators require specific controls if power network frequency changes to above or below set limits such as a frequency dead band. The dead band comprises an upper bound and a lower bound, around a nominal frequency, as would be well understood by a person skilled in the art.

Historically, within the frequency dead band, there was no expectation by power grid operators for wind and other renewable power plants to take steps to contribute to the stability of the power network. However, the increasing penetration of renewable power sources, whose supply is relatively volatile compared to traditional non-renewable sources, is resulting in power grid operators implementing stricter requirements for their operation. Some power grid operators now require that wind power plants are operated to counteract any deviation from the nominal frequency, even within the frequency dead band. Such measures are useful in improving overall stability of the power network—if deviations are counteracted at the earliest opportunity, then more detrimental deviations may also be avoided. However, as historically no action has been required by wind power plants in the dead band, current control methods are not appropriate for application in the dead band.

It is an aim of the present invention to address one or more of the disadvantages associated with the prior art.

SUMMARY OF THE INVENTION

According to an aspect of the present invention there is provided a method for controlling a renewable power plant connected to a power network to reduce deviation of a measured frequency of the power network from a target frequency. The method comprises: determining a forecasted power gradient over a forecast interval defined between a first time point and a second time point; and, at a third time point during the forecast interval, controlling the power plant to output active power according to a minimum active power level if the measured frequency at the third time point is below the target frequency, controlling the power plant to output active power according to a maximum active power level if the measured frequency at the third time point is above the target frequency. The maximum and minimum active power levels are based on the forecasted power gradient.

Implementing this method in renewable power plants advantageously results in an improved contribution by the power plant to the stability of the power network. The method is particularly suitable for use when the frequency deviations are within the frequency dead-band because it is a straightforward control method that does not require complex calculation or complex operation of the generators, such as wind turbines, photovoltaic cells, or batteries, or ancillary equipment. Long-term, committing to stabilisation of the frequency of the power network by implementing this method to reduce deviations in the dead-band leads to improved overall stabilisation and fewer severe frequency deviations.

Determining the forecasted power gradient may comprise receiving an active power level for the first time point and an active power level for the second time point; and determining the forecasted power gradient as the gradient between the received active power levels. Alternatively, determining the forecasted power gradient may comprise receiving the forecasted power gradient from a transmission system operator.

The active power level for the first time point may comprise a measured active power level. Alternatively, the active power level for the first time point may comprise an active power level received for the second time point of a previous forecast interval.

The active power level for the second time point may be received from a forecasting source external to the wind power plant.

The value of the maximum active power level may be the value of the forecasted power gradient at the third time point. The value of the minimum active power level may be the value of the forecasted power gradient at the third time point.

The value of the maximum active power level may be less than the value of the forecasted power gradient at the third time point. The value of the minimum active power level may be greater than the value of the forecasted power gradient at the third time point.

Controlling the power plant to output active power may comprise: receiving the measured frequency at the third time point; comparing the measured frequency with the target frequency; and determining whether the measured frequency is above, below, or equal to the target frequency.

If the measured frequency is determined to be equal to the target frequency, controlling the power plant to output active power may comprise controlling the power plant to maintain its present operation.

If the measured frequency at the third time point is determined to be above the target frequency, controlling the power plant to output active power may comprise: comparing an active power output level of the power plant at the third time point with the value of the forecasted power gradient at the third time point; and, if the active power output level is determined to be above the forecasted power gradient, communicating the maximum active power level to the power plant as an active power set point or, if the active power output level is determined to be equal to or below the forecasted power gradient, controlling the power plant to maintain its present operation.

Controlling the power plant to output active power may comprise curtailing the active power output level of the power plant to the active power set point.

If the measured frequency at the third time point is determined to be below the target frequency, controlling the power plant to output active power may comprise: comparing an active power output level of the power plant at the third time point with the forecasted power gradient; and, if the present active power output level is determined to be below the forecasted power gradient, communicating the minimum active power level to the power plant as an active power set point; or, if the active power output level is determined to be equal to or above the forecasted power gradient, controlling the power plant to maintain its present operation.

Controlling the power plant to output active power may comprise operating compensation equipment to supply additional active power. Controlling the power plant to output active power may comprise over-rating one or more generators of the power plant to supply additional active power to increase the active power output level of the power plant to the active power set point. Controlling the power plant to output active power may comprise using any suitable technology that permits an increase in the active power output of one or more of the generators.

The target frequency may be a nominal frequency of the power network.

According to another aspect of the invention, there is provided a power plant controller configured to implement a method as described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
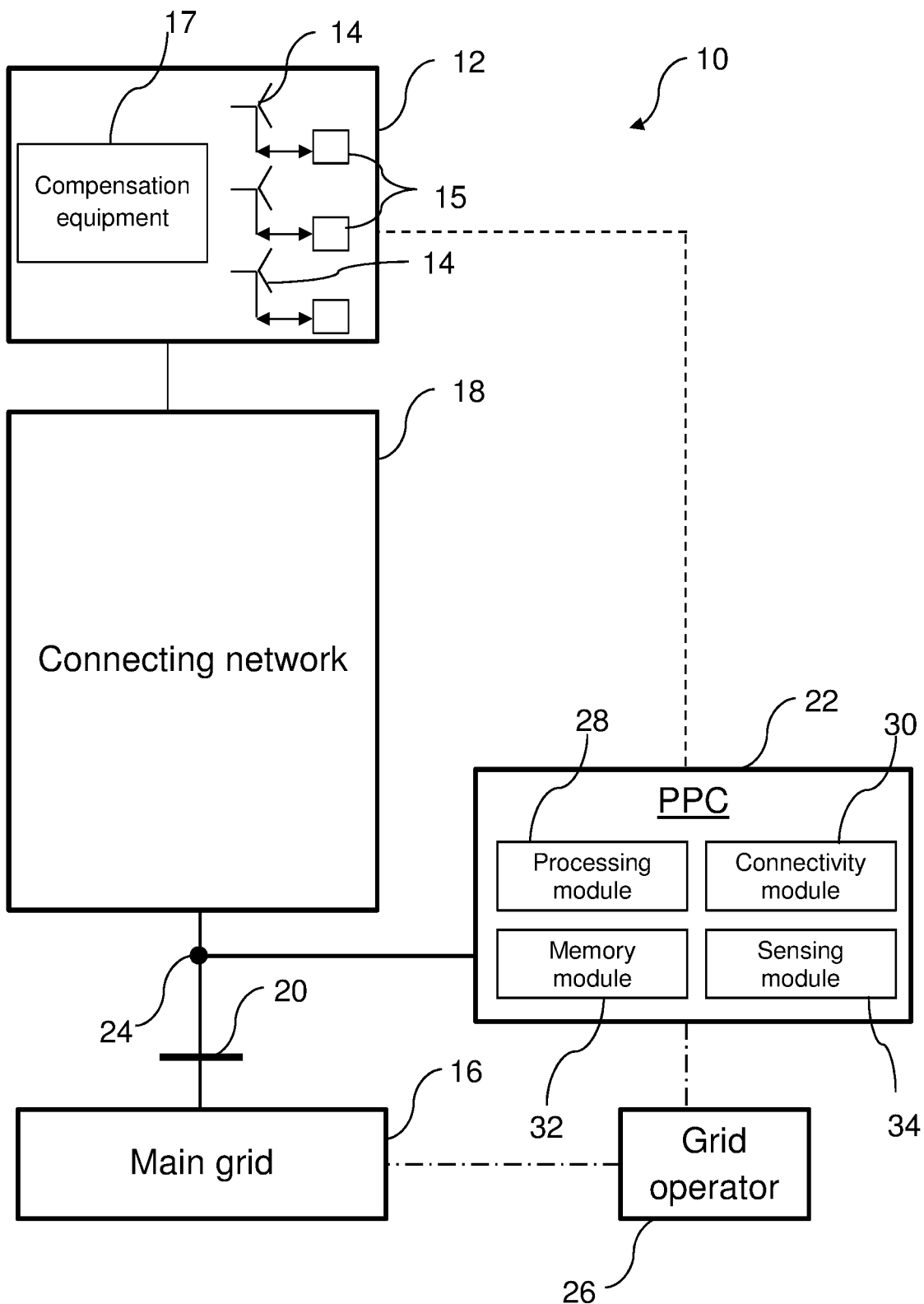
FIG. 1 is a schematic representation of a wind power plant, its connection to a grid, and its control system.

FIG. 1 illustrates a typical architecture in which a wind power plant (WPP) is connected to a main transmission grid as part of a wider power network. As will be understood by the skilled reader, a WPP comprises at least one wind turbine generator (WTG), and is also known as a wind park or a wind farm. A WTG is commonly referred to as a wind turbine. The examples shown are representative only and the skilled reader will appreciate that other specific architectures are possible, in relation to both wind power plants, power plants for other renewable energy sources, wind turbine generators and other renewable energy generating sources such as solar power plants comprising photovoltaic cells as well as power plants comprising batteries. Thus, the invention also relates to renewable energy power plants and renewable energy generators in general, rather than being specific to wind power plants and generators as in the Figures. In addition, the skilled reader will appreciate that methods, systems and techniques also described below may be applicable to many different configurations of power network. Moreover, the components of the wind power plant and power network are conventional and as such would be familiar to the skilled reader. It is expected that other known components may be incorporated in addition to or as alternatives to the components shown and described in FIG. 1. Such changes would be within the capabilities of the skilled person.

FIG. 1 shows a power network 10 incorporating a WPP 12. The WPP 12 includes a plurality of WTGs 14. Each of the plurality of WTGs 14 converts wind energy into electrical energy, which is transferred as active power from the WTGs 14 to a main transmission network, also referred to as a power network or a main grid 16, for distribution.

The WPP 12 also includes compensation equipment 17, such as a synchronous condenser, and/or static compensation equipment (STATCOM) and/or other generator types such as batteries or PV cells (in hybrid plants) configured to provide active and/or reactive power support as required. Compensation equipment 17 may not be present in some WPPs 12 operated according to embodiments of the invention.

Each of the WTGs 14 is associated with a respective WTG controller 15. In some examples, a set of WTGs may share a single, semi-centralised WTG controller, such that there are fewer WTG controllers than WTGs. As would be understood by the skilled person, WTG controllers 15 can be considered to be computer systems capable of operating a WTG 14 in the manner prescribed herein, and may comprise multiple modules that control individual components of the WTG or just a single controller. The computer system of the WTG controller 15 may operate according to software downloaded via a communications network or programmed onto it from a computer-readable storage medium.

During normal operation of the WPP 12, the WTG controllers 15 operate to implement active and reactive current requests or set points received from a power plant controller (PPC) 22. During extraordinary conditions, the WTG controllers 15 operate to fulfil predetermined network requirements, and also act to protect the WTGs 14 from any potentially harmful conditions. Normal operation may be defined as when voltage levels and frequency levels of the main grid 16 is within acceptable levels, typically a voltage or frequency deadband region surrounding a nominal voltage or frequency value. Extraordinary conditions occur when the voltage and/or frequency are not at acceptable levels. The methods described herein are generally concerned with normal operation of power plants.

The WPP 12 is connected to the main grid 16 by a connecting network 18. The WPP 12 and the main grid 16 are connected at a Point of Interconnection (PoI) 20, which is an interface between the WPP 12 and the main grid 16.

The PPC 22 is connected to the power network at a Point of Measurement (PoM) 24 and is connected directly to the WPP 12. The role of the PPC 22 is to act as a command and control interface between the WPP 12 and the grid 16, and more specifically, between the WPP 12 and a grid operator 26, which as described above may be a TSO or a DSO. The PPC 22 is a suitable computer system for carrying out the controls and commands as described above and so incorporates a processing module 28, a connectivity module 30, a memory module 32 and a sensing module 34. The PPC 22 may also receive information regarding the grid 16 and/or the local buses, substations and networks from an energy management system (not shown). The WPP 12 is capable of altering its power or current output in reaction to commands received from the PPC 22.

The PPC 22 is equipped to measure a variety of parameters including a representative power output that will be supplied to the main grid 16 at the PoI 20 by the WPP 12. As the PoM 24 is not at the PoI 20, the measured parameters are only representative as losses in the lines between the PoM 24 and PoI 20, and between the PoM 24 and the PPC 22, may have an effect on the measurements. Suitable compensation may take place to account for the losses to ensure that the measurements are accurate.

The PPC 22 communicates control commands to the WPP 12 in a suitable manner. It will be noted that FIG. 1 is a schematic view, so the way in which the control commands are transferred to the WPP 12 is not depicted explicitly. However, it will be appreciated that suitable cabling may be provided to interconnect the PPC 22 and the WPP 12. The interconnections may be direct or 'point to point' connections, or may be part of a local area network (LAN) operated under a suitable protocol (CAN-bus or Ethernet for example). Also, it should be appreciated that rather than using cabling, the control commands may be transmitted wirelessly over a suitable wireless network, for example operating under WiFi™ or ZigBee™ standards (IEEE802.11 and 802.15.4 respectively).

The grid operator 26 operates to coordinate the supply and demand for electricity/power from the power network 10, typically to avoid unwanted high-level deviations of frequency and voltage of the main grid 16. To allow the coordination of supply and demand, the grid operator 26 balances available supply and demand by generating forecasts of the available supply at a future time point. The forecast is produced for each power plant that is connected to the main grid 16, so, in the power network 10 of FIG. 1, the grid operator 26 generates at least a forecast of expected output for the WPP 12 at a point in the future. In generating a forecast of supply, the grid operator 26 is able to identify potential under- or over-generation and act accordingly. The forecasts are generated for a set time point in the future, at the end of a predetermined period of time, hereafter referred to as a forecast interval. A forecast interval may therefore be considered to be defined between a first time point marking the beginning of the forecast interval and a second time point marking the end of the forecast interval. The forecasted output is generated for the end of the forecast interval, i.e. at the second time point.

The diagram of FIG. 1 should be taken as a representation of a wind power plant 12 only. Alternative configurations of wind power plants are known and it is expected that other known components may be incorporated in addition to or as alternatives to the components shown and described in FIG. 1. Such changes would be within the capabilities of the skilled person.

During operation of the WPP 12, the frequency level of the main grid 16 may deviate from a nominal frequency level of the main grid 16. The nominal frequency level of national power networks is typically 50 Hz or 60 Hz, and the exact value may vary depending on country. Deviation of the frequency from the nominal frequency is usually acceptable within a frequency dead band. The frequency dead band may be a region either side of the nominal frequency. For example in a 50 Hz network, the frequency dead band may be 49.85 Hz to 50.15 Hz, i.e. 0.15 Hz either side of the nominal frequency. If the frequency of the power network deviates to a level outside of the dead band, power plants connected to the network as well as the grid have certain protection devices and/or control mechanisms to ensure that the frequency deviation is not detrimental to the power network and so that it can be returned to within the dead band quickly.

As described above, it is useful to strive to reduce any deviations from the nominal frequency, even within the dead band of the power network. A WPP that is acting to reduce deviations is contributing to the overall stability of the grid it is connected to, reducing the likelihood that the grid is destabilised in future and that more serious deviations occur.

Figure 2:
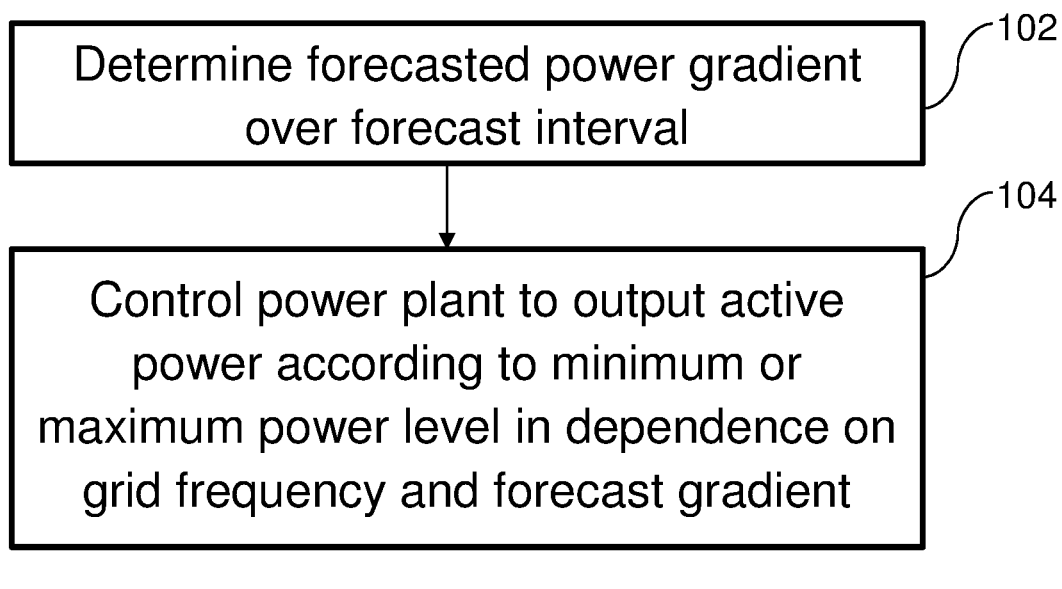
FIG. 2 is a flow chart governing the operation of the control system of FIG. 1 for controlling the wind power plant in order to reduce deviation of a frequency of the grid from a nominal frequency according to an embodiment of the invention.

The method 100 of FIG. 2 is provided as a method suitable for controlling the WPP 12 in order to reduce deviations from the nominal frequency within the frequency dead band of the main grid 16, with the intention of improving or at least contributing to the stability of the main grid 16.

Generally, the method 100 of FIG. 2 operates to ensure that when the frequency of the main grid 16, as measured or received by the PPC 22, is different to the nominal frequency, the PPC 22 acts to control the WPP 12 so that it is contributing to the stabilisation of the main grid 16 and not contributing to its destabilisation. The WPP 12 is able to contribute to the stabilisation of the main grid 16 by supplying active power to the main grid 16 at a particular level according to the demand placed on the main grid 16 by end users.

Over- or under-generation of active power by the WPP 12, when compared to the demand from end users on the main grid 16, contributes to changes in the frequency level of the main grid 16. If the frequency level of the main grid 16 is higher than the nominal frequency level and the WPP 12 is generating active power higher than the demanded level, i.e. over-generating, the WPP 12 is acting to further increase the frequency level, and thereby destabilising the main grid 16 by causing increased deviation from the nominal frequency level. Similarly, if the frequency level of the main grid 16 is lower than the nominal frequency level and the WPP 12 is generating active power lower than the demanded level, i.e. under-generating, the WPP 12 is acting to further decrease the frequency level, and thereby destabilising the main grid 16 by causing increased deviation from the nominal frequency level.

On the other hand, under-generation while the frequency level of the main grid 16 is above the nominal level and over-generation while the frequency level of the main grid is below the nominal level are desirable as the WPP 12 is then considered to be contributing to the stabilisation of the main grid 16.

The method 100 of FIG. 2 operates to counteract the destabilisation effects caused by over- or under-generation when the frequency level is above or below the nominal level respectively. By making use of the way in which the grid operator 26 acts to balance available supply with the demand from end users, over- or under-generation that causes destabilisation can be identified and/or prevented.

As noted above in relation to FIG. 1, the grid operator 26 balances available supply and demand by generating forecasts of the available supply to identify potential under- or over-generation and act accordingly. The forecasts are made for regular forecast intervals for each power plant connected to the main grid 16. The length of each forecast interval may be any period of time. For example, each forecast interval may be for a period of time selected from the following: 5 minutes; 10 minutes; 15 minutes; 30 minutes; or 1 hour. In other examples, the forecast intervals may be any length of time. Forecasts may be received from a source external to the grid operator 26 such as a national forecasting service.

Accordingly, the method 100 of FIG. 2 begins with the step 102 in which a forecasted power gradient is determined over a forecast interval. As described above, forecast intervals are defined over a period of time between first and second time points, marking the beginning and end of the forecast respectively. Therefore, the forecasted power gradient is provided as a gradient or slope between an active power level for the first time point and an active power level for the second time point. It will be appreciated that the term 'gradient' is here used to refer to the actual line or slope between two points rather than the numerical value for the steepness of the line. Accordingly, points on the forecasted power gradient at specific times can be compared with measurements taken at that time.

The forecasted power gradient defines a threshold for indicating over- or under-generation of active power by the WPP 12. In this respect, the gradient for the forecast between the beginning and end points of the forecast is used as an approximation to the demand by the end users, and so can be used to indicate over- or under-generation accordingly. The gradient may be flat if the active power levels at the first and second time points are the same.

In this step 102, determining the forecasted power gradient may include the PPC 22 receiving the forecasted power gradient directly from the grid operator 26 or from elsewhere, such as an external forecasting service associated with the PPC 22, WPP 12, or grid operator 26. Alternatively, determining the forecasted power gradient may include the PPC 22 receiving the active power levels at the first and second time points, with the active power level for the second time point being the forecasted level received from the forecasting service, and calculating the forecasted power gradient based on the active power levels it receives. In a further alternative, determining the forecasted power gradient may include the PPC 22 receiving a forecasted wind profile from which the power gradient can be subsequently calculated.

The active power level for the first time point may be determined by measurement from the WPP 12, or may be determined as the active power level at the end of the immediately prior forecast interval may be re-used. The active power level for the second time point is the active power level that the WPP 12 is expected to be producing at the second time point of the forecast interval.

It is envisaged that in some embodiments where the active power levels for the first and second time points are received by the PPC 22, the active power levels will be received prior to the first time point of the forecast interval so that the gradient may be generated before the forecast interval begins. Alternatively, in other embodiments, one or both of the active power levels may be received at the beginning of the forecast interval, so that the gradient is generated as close as possible to the beginning of the forecast interval. Similarly, in embodiments where the grid operator 26 provides the forecasted power gradient directly to the PPC 22, the gradient is provided prior to or at the first time point of the forecast interval.

The next step 104 of the method 100 of FIG. 2 is performed during the forecast interval. It is envisaged that this step 104 will be repeated at a plurality of regularly spaced time points during the forecast interval. At the very least, the step will be performed at one time point in the forecast interval. This time point may be considered to be a third time point which is in the forecast interval. In some embodiments, the third time point may be the same as the first or second time points.

At this step 104, during the forecast interval, the WPP 12 is controlled to output active power according to a minimum active power level or according to a maximum active power level. Which active power level the WPP 12 is controlled according to is based on the measured frequency of the main grid 16 at that time. In particular, if the measured frequency at the time point that step 104 is performed is below a target frequency or frequency threshold, which is typically the nominal frequency, this step 104 of the method 100 comprises controlling the WPP 12 to output active power according to the minimum active power level, i.e. at or above the minimum active power level. If the measured frequency is above the target frequency, this step 104 of the method 100 comprises controlling the WPP 12 to output active power according to the maximum active power level, i.e. at or below the maximum active power level.

The maximum and minimum active power levels are based on the forecasted power gradient determined in the earlier step 102, which is used as an active power threshold. In some embodiments, the maximum and minimum active power levels are the value of the gradient at that time point. In other embodiments, the maximum and minimum active power levels are based on the value of the gradient at the time point but are respectively proportionally smaller or larger than the gradient to provide a buffer region.

Figure 3:
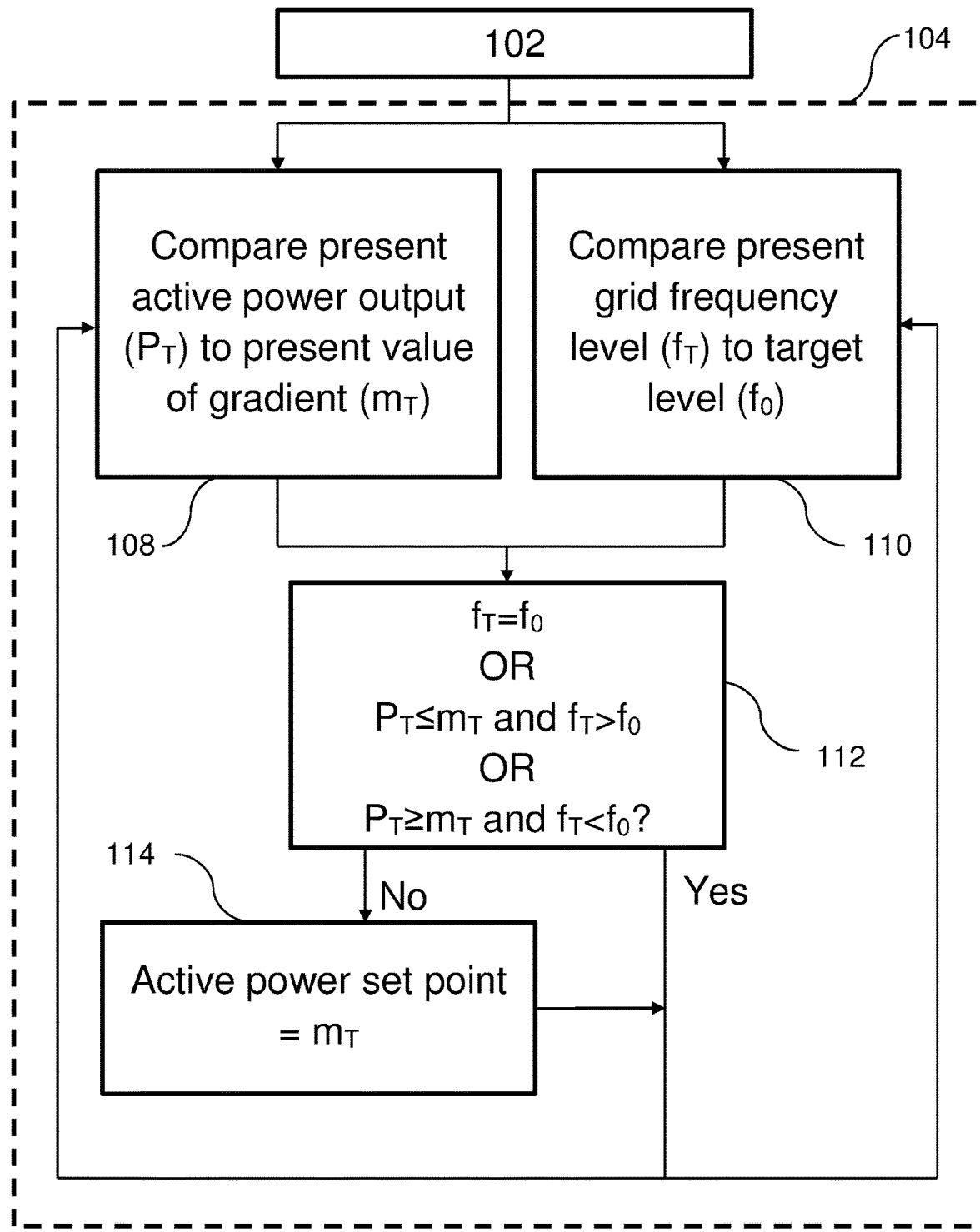
FIG. 3 is a flow chart demonstrating how the step of controlling the power plant is performed in FIG. 2 according to an embodiment of the invention.

FIG. 3 shows an example of how the control step 104 of the method 100 of FIG. 2 may be performed. The steps of the flow chart in FIG. 3 are performed during the forecast interval following the step 102 of determination of the forecasted power gradient.

Having determined the forecasted power gradient, two comparison steps 108, 110 are performed in FIG. 3. In one of the comparison steps 108, the present active power output from the WPP 12 is compared to the present value of the forecasted power gradient. By present active power output and present value of the forecasted power gradient, it is meant the active power output and value of the forecasted power gradient at a time point. i.e. a third time point, during the forecast interval. In other words, at a time point T during the forecast interval, the active power output of the WPP 12, $P_T$, for that time point, T, is compared to the value for the forecasted power gradient, $m_T$, at that time point T. The active power output may be measured directly by the PPC 22 or otherwise received.

In the other of the comparison steps 110, the present grid frequency level is compared to the target frequency level. Put another way, at the time point T, the frequency level of the main grid 16, $f_T$, at the time point T, is compared to the target frequency, which in this case is the nominal frequency, $f_0$. The frequency level of the main grid 16 may be measured by the PPC 22 directly or otherwise received.

Both comparison steps 108, 110 are performed to establish whether the relevant parameter is above or below its relevant threshold or target. During the forecast interval, the comparison steps may be repeated at regularly spaced time points within each forecast interval. For example, the regularly spaced time points may be spaced apart by 0.5 s, 1 s, 3 s, 4 s, 5 s, 10 s, 1 minute, or 5 minutes.

The next step 112 of the method is a step to determine whether the outcome of the comparisons requires a change in control of the WPP 12. In step 112, there are three outcomes where the flow chart returns to the comparison steps 108, 110 without any change in control of the WPP 12 being required, ie. 'Yes' in response to step 112. The control of the WPP 12 is here provided in controlling the WPP 12 to continue its operation without change.

These three outcomes are outcomes where the WPP 12 is acting to stabilise the main grid 16 and/or where the frequency level is at the nominal frequency. As can be seen in step 112, these three outcomes are: (1) the frequency level of the main grid 16 is equal to the nominal frequency, i.e. $f_T = f_0$; (2) the active power output of the WPP 12 is equal to or less than the value of the gradient at that time point and the frequency level of the main grid 16 is greater than the nominal frequency, i.e. $P_T \leq m_T$ and $f_T > f_0$; or (3) the active power output of the WPP 12 is equal to or greater than the level of the gradient at that time point and the frequency level of the main grid 16 is less than the nominal frequency, i.e. $P_T \geq m_T$ and $f_T < f_0$.

If the outcome of the comparisons do not fulfil these requirements, for example if both parameters active power output of the WPP 12 and frequency level of the main grid 16 are above their respective threshold/target or below their threshold/target, i.e. $P_T > m_T$ and $f_T > f_0$ or $P_T < m_T$ and $f_T < f_0$, then the answer to step 112 is 'No'. In these outcomes, the WPP 12 is considered to be contributing to the destabilisation of the main grid 16 and the active power output of the WPP 12 needs to be changed. Accordingly, an active power set point for the WPP 12 is generated and output to the WPP 12 according to the gradient at step 114. The active power set point is set as $m_T$, the value of the gradient at time T. When considered in the context of step 104 of FIG. 2, the setting of an active power set point is essentially setting a maximum active power output for the WPP 12 where the active power output and frequency level are both above their respective threshold/target and setting a minimum active power output for the WPP 12 where the active power output and frequency level are both below their respective threshold/target.

It will be appreciated that the flow chart of FIG. 3 is by way of example only, and that the decision step 112 may be phrased in other ways. In another flow chart, the test may be performed to establish whether the WPP 12 is destabilising the main grid 16 by identifying whether the opposite is true, the opposite being $P_T > m_T$ and $f_T > f_0$ or $P_T < m_T$ and $f_T < f_0$, so that a 'yes' answer leads to the setting of the active power set point and a 'no' answer leads to a repeat of the comparison steps.

In some embodiments, the frequency comparison step 110 may precede the active power comparison step 108, with differing comparisons being performed depending upon the result of the frequency comparison. In other embodiments, the active power comparison step 108 may precede the frequency comparison step 110, with differing comparisons being performed depending upon the result of the active power comparison.

As noted above, for the three outcomes illustrated in step 112, $f_T = f_0$, $P_T \leq m_T$ and $f_T > f_0$, or $P_T \geq m_T$ and $f_T < f_0$, the WPP 12 is effectively already operating at or above a minimum active power output level and/or at or below the maximum active power output level defined by the forecasted power gradient. In alternative embodiments, the maximum or minimum active power levels may be provided to the wind turbine as required regardless of the level of the active power output so that the WPP 12 is operated within the required boundaries. In other words, the control step 104 of the method 100 of FIG. 2 would be a frequency-based comparison only, and the set point output to the WPP 12 would be a maximum or minimum or no set point based on whether the frequency was above, below, or equal to the nominal frequency respectively.

To provide context to the method 100 of FIG. 2 and the step 104 of FIG. 3, an example of the implementation of method 100 will now be described in relation to FIGS. 4a and 4b.

Figure 4A:
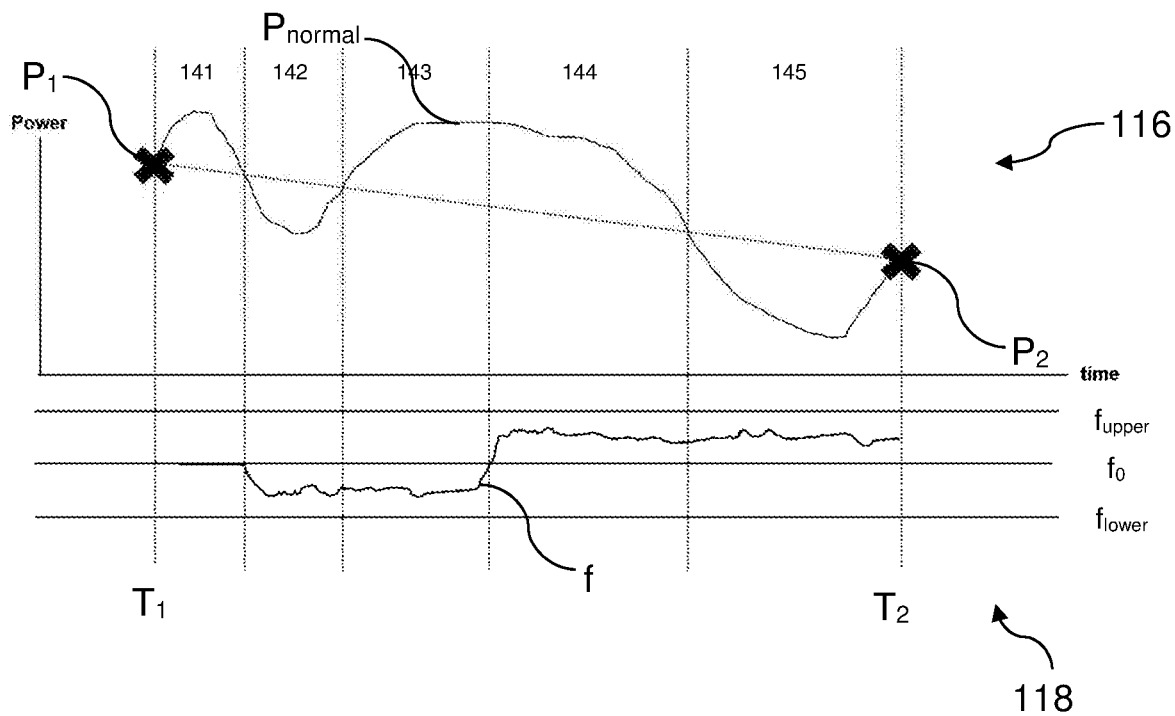
FIGS. 4a and 4b each show two charts illustrating an example active power output of a wind power plant and a corresponding frequency level of the grid over a forecast interval, without and with implementing the method of FIGS. 2 and 3.

FIG. 4a illustrates two charts 116, 118 that respectively illustrate a typical active power output of the WPP 12 and a frequency level of the main grid 16 within the frequency dead band during a forecast interval. The upper chart 116 illustrates the active power output, $P_{normal}$, between the beginning of the forecast interval, $T_1$, and the end of the forecast interval, $T_2$, an active power level, $P_1$, for the beginning of the forecast interval, an active power level, $P_2$, for the end of the forecast interval, and a forecasted power gradient, m, between the active power levels, $P_1$, $P_2$. The lower chart 118 illustrates a frequency level, f, of the main grid 16, the nominal frequency $f_0$, and the upper and lower deadband values $f_{upper}$, $f_{lower}$. The nominal frequency $f_0$ is here used as the target frequency.

It should be noted that in FIG. 4a the active power levels normally output by the WPP 12 are shown without the implementation of the method of FIGS. 2 and 3, but including the forecasted power gradient for comparative purposes. In other words, the information required for performing the method of FIG. 2 is shown but the outcome is not. Instead, the outcome of the method is described.

Figure 4B:
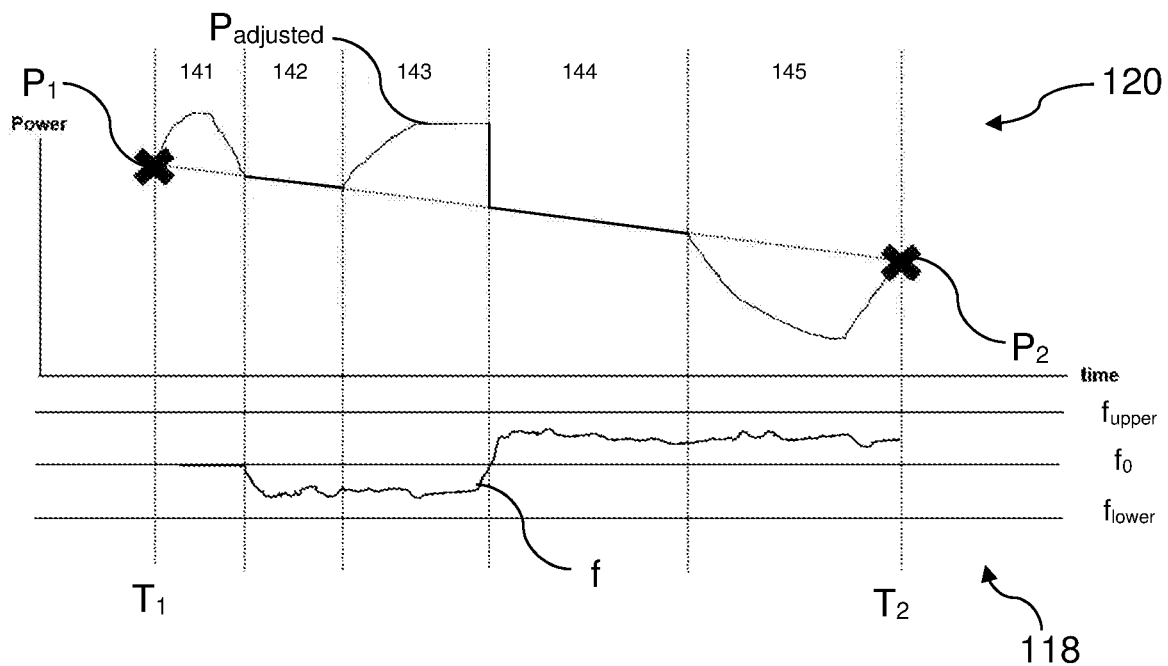

FIG. 4b is provided to illustrate the same forecast interval to which the method of FIGS. 2 and 3 has been applied. In FIG. 4b, two charts 120 and 118 respectively are provided, the first 120 illustrating an active power output of the WPP 12 with the method of FIGS. 2 and 3 applied, and second 118 illustrating the frequency level of the main grid 16 within the frequency dead band during the forecast interval as in FIG. 4a. The upper chart 120 illustrates the active power output, $P_{adjusted}$, between the beginning of the forecast interval. $T_1$, and the end of the forecast interval, $T_2$, as well as the active power level, $P_1$, for the beginning of the forecast interval, the active power level, $P_2$, for the end of the forecast interval, and the forecasted power gradient, m, between the active power levels, $P_1$, $P_2$ as in FIG. 4a. As in FIG. 4a, the lower chart 118 illustrates the frequency level, f, of the main grid 16, the nominal frequency $f_0$, and the upper and lower deadband values $f_{upper}$, $f_{lower}$.

As can be seen in FIGS. 4a and 4b, the active power level, $P_1$, for the beginning of the forecast interval is known, and the active power level, $P_2$, is also provided. The forecasted power gradient, m, has also been calculated between the two levels, $P_1$, $P_2$ and is shown in both FIGS. 4a and 4b. Accordingly, the step 102 has been performed as the forecasted power gradient has been determined.

During the interval, the WPP 12 typically outputs active power, $P_{normal}$, at a variable level as illustrated in the upper chart 116 of FIG. 4a. At the same time, during the forecast interval, the frequency level, f, of the main grid 16 varies within the dead band limits $f_{upper}$, $f_{lower}$. For clarity and ease of discussion, the forecast interval is split into five different periods 141 to 145 each illustrating a different scenario, and these will be discussed in order now.

In the first period 141, the active power level begins at the same value as the active power level, $P_1$, at the beginning of the forecast interval in both FIGS. 4*a* and 4*b*. During the first period 141, the frequency level, f, of the main grid 16 is equal to the nominal frequency level $f_0$.

Therefore, when applying step 104 as expanded upon in FIG. 3, the frequency level, f, at all times T in this period 141 is not above or below the nominal frequency but instead is equal to it, and so the answer at step 112 of FIG. 3 is 'Yes'. Following the flow of FIG. 3, the comparison steps 108, 110 are repeated and no action is taken, as can be seen in chart 120 of FIG. 4*b*. For all comparisons in period 141, the answer is 'Yes'. Accordingly, the active power level at all times T in the first period 141 is unimportant as the frequency level of the grid, f, at all times T in the period 141 is equal to the nominal frequency.

In the second period 142, the frequency level, f, drops below the nominal frequency, $f_0$, and so is between the nominal frequency, $f_0$, and the lower band of the dead band, $f_{lower}$. According to FIG. 2, the WPP 12 should therefore be controlled according to a minimum active power level. As can be seen in FIG. 4*a*, without any control the active power level, $P_{normal}$, drops below the forecasted power gradient, m, and so the WPP 12 is contributing to the destabilisation of the main grid 16.

When applying the method of FIGS. 2 and 3, the answer to step 112 is 'No', because $P_T < m_T$ and $f_T < f_0$ in the second period. Therefore, the control step 106 sets the active power set point to the value of the gradient, $m_T$, throughout the period 142. Accordingly, as shown in FIG. 4*b*, a minimum active power is identified for as long as the frequency value remains below the nominal frequency, and the WPP 12 is controlled according to the minimum set point.

In order to increase the active power level to the active power set point, the WPP 12 may use compensation equipment 17 to increase its active power output to the set point and/or over-rate one or more of the WTGs 14 to provide increased active power output for a short period of time.

Alternatively or additionally, other means may be used to increase active power levels output from the WPP 12. Any device that provides additional active power production or control method that can release additional active power from the WTGs 14 of the WPP 12 may be utilised here. For example, in some embodiments, over-rating or boosting of output from the WPP 12 to increase the active power level to the active power set point may be achieved by pitching the wind turbine blades and controlling the generator and converter system in the WTGs 14 to allow more power to be produced, regardless of the additional wear that will be produced.

Alternatively, additional active power may be leveraged by performing short-term forecasts within the forecast interval to determine the expected output during those shorter periods and to determine whether a boost will be required based on the short-term forecast and the forecast power gradient. In these embodiments, a separate forecasting system predicts a power output over a short period of time within the forecast interval, and this predicted short-term forecast output is compared with the actual output throughout the period to estimate whether the predicted power output will be achieved at the end of the period. If the predicted power output will be achieved and the output will be above the forecast power gradient, then there is no need for boosting of the power. However, if the predicted power output is expected to be below the forecast power gradient, and/or if the predicted power output is expected to be above the forecast power gradient but subsequent estimation based on measurement and meteorological data indicates that the forecast power gradient will not be met, then a boosting of the output of the WTGs 14 of the WPP 12 is performed. The above methods may be combined to evaluate the wear of the turbine based on forecasts, and to generate additional power if it is permitted based on a control methodology.

The beginning of the third period 143 illustrated in FIG. 4*a* is where the active power level rises above the gradient again. As the frequency level is still below the nominal frequency and the active power level is now above the value indicated by the gradient, the WPP 12 is operating at a level above the minimum level specified by the frequency level being below the nominal frequency. Accordingly, the answer to the step 112 is 'Yes', so no further action is taken and the comparisons are performed again. Throughout the third period 143, the answer is 'yes' and so no action is taken throughout the period 143. As can be seen in FIGS. 4*a* and 4*b*, the active power levels of the WPP 12 are the same in this period 143.

In the fourth period 144, the active power output level of the WPP 12 remains above the value of the gradient, but the frequency level rises to a level between the nominal frequency $f_0$ and the upper bound of the deadband, $f_{upper}$. This means that both the active power level and the frequency level are above their respective thresholds, i.e. in step 112 $P_T > m_T$ and $f_T > f_0$, so the answer to step 112 is 'no' and so the active set point is set to $m_T$, i.e. a maximum active power set point is set for the WPP 12 to curtail its generation towards.

In this case, the active power output of the WPP 12 is curtailed by applying curtailment measures such as pitching the blades of the WTGs 14 so that lower active power levels are produced, or, in extreme cases, by utilising the dump load or applying braking force to the rotor. As with the increase of active power, any method that suitably curtails active power production by the WPP 12 can be utilised here. As can be seen in FIG. 4*b*, the curtailment brings the active power output of the WPP 12 to the value of the gradient throughout this period 144.

Finally, in the fifth period 145, the active power level falls below the gradient again but the frequency level remains above the nominal frequency so the maximum active power is not exceeded, the answer to step 112 is 'yes' and there is no action to be taken by any comparisons performed during this period 145. The WPP 12 is providing active power below the maximum active power level.

In some embodiments, the setting of only one of the maximum or minimum active power level may be implemented only according to how the WPP 12 can be controlled. Generally, where compensation equipment is unavailable, it is likely that the WPP 12 will be controlled according to a maximum active power level only as required, as the WPP 12 can actively curtail active power output but it is more difficult to increase active power output on demand without the use of compensation equipment.

It will be appreciated that various changes and modifications can be made to the present invention without departing from the scope of the present application.

The invention claimed is:

1. A method for controlling a renewable power plant connected to a power network to reduce deviation of a measured frequency of the power network from a target frequency, the method comprising:
   determining a forecasted power gradient over a forecast interval defined between a first time point and a second time point; and at a third time point during the forecast interval, controlling the power plant to output active power according to a minimum active power level if the measured frequency at the third time point is below the target frequency, controlling the power plant to output active power according to a maximum active power level if the measured frequency at the third time point is above the target frequency, wherein:

the maximum and minimum active power levels are based on the forecasted power gradient.

2. The method of claim 1, wherein determining the forecasted power gradient comprises:

receiving an active power level for the first time point and an active power level for the second time point; and determining the forecasted power gradient as the gradient between the received active power levels.

3. The method of claim 2, wherein the active power level for the first time point comprises a measured active power level.

4. The method of claim 2, wherein the active power level for the first time point comprises an active power level received for the second time point of a previous forecast interval.

5. The method of claim 2, wherein the active power level for the second time point is received from a forecasting source external to the power plant.

6. The method of claim 1, wherein determining the forecasted power gradient comprises receiving the forecasted power gradient from a transmission system operator.

7. The method of claim 1, wherein a value of the maximum active power level or a value of the minimum active power level is a value of the forecasted power gradient at the third time point.

8. The method of claim 1, wherein a value of the maximum active power level is less than a value of the forecasted power gradient at a third time point or a value of the minimum active power level is greater than the value of the forecasted power gradient at the third time point.

9. The method of claim 1, wherein controlling the power plant to output active power comprises:

receiving the measured frequency at the third time point;

comparing the measured frequency with the target frequency;

determining whether the measured frequency is above, below, or equal to the target frequency; and if the measured frequency is determined to be equal to the target frequency, controlling the power plant to maintain its present operation.

10. The method of claim 9, wherein, if the measured frequency at the third time point is determined to be above the target frequency, controlling the power plant to output active power comprises:

comparing an active power output level of the power plant at the third time point with a value of the forecasted power gradient at the third time point;

if the active power output level is determined to be above the forecasted power gradient, communicating the maximum active power level to the power plant as an active power set point; and if the active power output level is determined to be equal to or below the forecasted power gradient, controlling the power plant to maintain its present operation.

11. The method of claim 10, wherein controlling the power plant to output active power further comprises curtailing the active power output level of the power plant to the active power set point.

12. The method of claim 9, wherein, if the measured frequency at the third time point is determined to be below the target frequency, controlling the power plant to output active power comprises:

comparing an active power output level of the power plant at the third time point with the forecasted power gradient; and when a present active power output level is determined to be below the forecasted power gradient, communicating the minimum active power level to the power plant as an active power set point; and when the active power output level is determined to be equal to or above the forecasted power gradient, controlling the power plant to maintain its present operation.

13. The method of claim 12, wherein controlling the power plant to output active power further comprises operating compensation equipment to supply additional active power and/or over-rating one or more generators of the power plant to supply additional active power to increase the active power output level of the power plant to the active power set point.

14. The method of claim 1, wherein the target frequency is a nominal frequency of the power network.

15. A power plant controller comprising one or more processors and a memory containing instructions, wherein at least one of the one or more processors, when programmed with the instructions, is configured to perform an operation for controlling a renewable power plant connected to a power network to reduce deviation of a measured frequency of the power network from a target frequency, the operation comprising:

determining a forecasted power gradient over a forecast interval defined between a first time point and a second time point; and at a third time point during the forecast interval, controlling the power plant to output active power according to a minimum active power level if the measured frequency at the third time point is below the target frequency, controlling the power plant to output active power according to a maximum active power level if the measured frequency at the third time point is above the target frequency, wherein:

the maximum and minimum active power levels are based on the forecasted power gradient.

16. The power plant controller of claim 15, wherein determining the forecasted power gradient comprises:

receiving an active power level for the first time point and an active power level for the second time point; and determining the forecasted power gradient as the gradient between the received active power levels.

17. The power plant controller of claim 16, wherein the active power level for the first time point comprises a measured active power level.

18. The power plant controller of claim 16, wherein the active power level for the first time point comprises an active power level received for the second time point of a previous forecast interval.

19. The power plant controller of claim 16, wherein the active power level for the second time point is received from a forecasting source external to the power plant.

* * * * *